US008087051B2

(12) United States Patent
Gogoi et al.

(10) Patent No.: US 8,087,051 B2
(45) Date of Patent: Dec. 27, 2011

(54) DATABASE MANAGEMENT SYSTEM AND METHOD FOR ELECTRONIC PROGRAM GUIDE AND TELEVISION CHANNEL LINEUP ORGANIZATION

(75) Inventors: Amar Gogoi, Fremont, CA (US); Labeeb Ismail, San Francisco, CA (US); Santosh Godbole, Sunnyvale, CA (US); Yunis Mustafa, Sunnyvale, CA (US); Oleg Larin, Fremont, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1848 days.

(21) Appl. No.: 10/156,173

(22) Filed: May 28, 2002

(65) Prior Publication Data
US 2002/0186296 A1 Dec. 12, 2002

Related U.S. Application Data

(63) Continuation-in-part of application No. 09/893,192, filed on Jun. 27, 2001.

(60) Provisional application No. 60/293,763, filed on May 25, 2001, provisional application No. 60/215,450, filed on Jun. 30, 2000, provisional application No. 60/226,437, filed on Aug. 18, 2000.

(51) Int. Cl.
*G06F 3/00* (2006.01)
*G06F 13/00* (2006.01)
*H04N 5/445* (2006.01)
(52) U.S. Cl. ........................................... 725/56; 725/50
(58) Field of Classification Search .................... 725/50, 725/48, 49, 56, 59, 46, 54
See application file for complete search history.

(56) References Cited

U.S. PATENT DOCUMENTS

| 5,223,924 A | 6/1993 | Strubbe |
| 5,262,875 A | 11/1993 | Mincer et al. |
| 5,324,338 A | 6/1994 | Holmstrom |

(Continued)

FOREIGN PATENT DOCUMENTS

EP  0 774 866 A2  5/1997

(Continued)

OTHER PUBLICATIONS

*Reference Material*, by OpenCable, Jun. 5, 1998, http://www.opencable.com/reference/index.html.

(Continued)

*Primary Examiner* — Kristine Kincaid
*Assistant Examiner* — Chris Parry
(74) *Attorney, Agent, or Firm* — Robert D. Shedd; Vincent E. Duffy; Joel M. Fogelson

(57) ABSTRACT

Channel lineup information in a television system is efficiently managed with an internal electronic program guide manager (IEM). The IEM creates and maintains an internal electronic program guide (EPG) information database for a user program preference determination engine (PDE), which is resident in a STB, DTV or PVR. The internal EPG data are for use by software agents of the PDE only. The external EPG is used for a graphical user interface display. First, external channel lineup information is received from an external program guide; from that, internal channel lineup information is generated that contains less information than the external channel lineup information, yet sufficient information to render the internal channel lineup information useful in the internal database management system; and the internal channel lineup information is updated upon receiving notification of a change to the external channel lineup information.

18 Claims, 4 Drawing Sheets

U.S. PATENT DOCUMENTS

| | | | |
|---|---|---|---|
| 5,355,161 A | 10/1994 | Bird et al. | |
| 5,371,551 A | 12/1994 | Logan et al. | 386/112 |
| 5,410,344 A | 4/1995 | Graves et al. | |
| 5,446,919 A | 8/1995 | Wilkins | |
| 5,463,565 A | 10/1995 | Cookson et al. | |
| 5,483,278 A | 1/1996 | Strubbe et al. | |
| 5,537,157 A | 7/1996 | Washino et al. | |
| 5,559,549 A | 9/1996 | Hendricks | |
| 5,565,909 A | 10/1996 | Thibadeau | |
| 5,585,865 A | 12/1996 | Amano et al. | 725/14 |
| 5,600,364 A | 2/1997 | Hendricks et al. | |
| 5,635,989 A * | 6/1997 | Rothmuller | 725/53 |
| 5,636,346 A | 6/1997 | Saxe | |
| 5,652,613 A * | 7/1997 | Lazarus et al. | 725/50 |
| 5,664,046 A | 9/1997 | Abecassis | |
| 5,671,411 A | 9/1997 | Watts et al. | |
| 5,699,473 A | 12/1997 | Kim | |
| 5,701,383 A | 12/1997 | Russo et al. | |
| 5,704,017 A | 12/1997 | Heckerman et al. | |
| 5,717,923 A | 2/1998 | Dedrick | |
| 5,724,091 A | 3/1998 | Freeman et al. | 725/138 |
| 5,724,521 A | 3/1998 | Dedrick | |
| 5,754,651 A | 5/1998 | Blatter et al. | |
| 5,758,257 A | 5/1998 | Herz et al. | 725/116 |
| 5,758,259 A | 5/1998 | Lawler | |
| 5,761,371 A | 6/1998 | Ohno et al. | |
| 5,768,785 A | 6/1998 | Pessin | |
| 5,774,170 A | 6/1998 | Hite | |
| 5,778,135 A | 7/1998 | Ottesen et al. | 386/52 |
| 5,781,228 A | 7/1998 | Sposato | |
| 5,790,935 A | 8/1998 | Payton | |
| 5,798,785 A | 8/1998 | Hendricks et al. | |
| 5,801,747 A | 9/1998 | Bedard | |
| 5,809,471 A | 9/1998 | Brodsky | |
| 5,818,441 A | 10/1998 | Throckmorton et al. | |
| 5,835,087 A | 11/1998 | Herz et al. | |
| 5,848,396 A | 12/1998 | Gerace | |
| 5,867,226 A | 2/1999 | Wehmeyer et al. | |
| 5,898,456 A | 4/1999 | Wahl | 725/91 |
| 5,907,350 A | 5/1999 | Nemirofsky | |
| 5,945,988 A * | 8/1999 | Williams et al. | 715/747 |
| 5,953,073 A | 9/1999 | Kozina et al. | 348/558 |
| 5,977,964 A | 11/1999 | Williams et al. | 386/83 |
| 5,990,927 A | 11/1999 | Hendricks et al. | |
| 6,002,393 A | 12/1999 | Hite | |
| 6,005,561 A | 12/1999 | Hawkins et al. | |
| 6,005,597 A | 12/1999 | Barrett et al. | |
| 6,018,612 A | 1/2000 | Thomason et al. | |
| 6,020,883 A | 2/2000 | Herz et al. | |
| 6,029,045 A | 2/2000 | Picco et al. | |
| 6,029,195 A | 2/2000 | Herz | |
| 6,038,612 A | 3/2000 | Liow | |
| 6,088,722 A | 7/2000 | Herz et al. | |
| 6,091,883 A | 7/2000 | Artigalas et al. | 386/83 |
| 6,101,529 A | 8/2000 | Chrabaszcz | |
| 6,128,009 A * | 10/2000 | Ohkura et al. | 725/46 |
| 6,134,532 A | 10/2000 | Lazarus et al. | |
| 6,157,411 A * | 12/2000 | Williams et al. | 348/552 |
| 6,157,772 A | 12/2000 | Kim | 386/83 |
| 6,160,570 A | 12/2000 | Sitnik | |
| 6,169,842 B1 | 1/2001 | Pijnenburg et al. | |
| 6,177,931 B1 | 1/2001 | Alexander et al. | |
| 6,185,360 B1 | 2/2001 | Inoue et al. | |
| 6,209,131 B1 * | 3/2001 | Kim et al. | 725/50 |
| 6,233,389 B1 | 5/2001 | Barton | 386/46 |
| 6,236,395 B1 | 5/2001 | Sezan et al. | |
| 6,260,194 B1 | 7/2001 | Shiels et al. | |
| 6,304,714 B1 | 10/2001 | Krause et al. | |
| 6,317,881 B1 | 11/2001 | Shah-Nazaroff et al. | 725/24 |
| 6,324,334 B1 | 11/2001 | Morioka et al. | |
| 6,324,338 B1 | 11/2001 | Wood | |
| 6,396,500 B1 | 5/2002 | Qureshi et al. | |
| 6,401,242 B1 * | 6/2002 | Eyer et al. | 725/35 |
| 6,446,261 B1 | 9/2002 | Rosser | |
| 6,457,010 B1 | 9/2002 | Eldering et al. | |
| 6,463,585 B1 | 10/2002 | Hendricks et al. | |
| 6,466,241 B1 | 10/2002 | Schindler | 715/854 |
| 6,480,667 B1 | 11/2002 | O'Connor | |
| 6,507,950 B1 * | 1/2003 | Tsukidate et al. | 725/54 |
| 6,530,082 B1 | 3/2003 | Del Sesto et al. | |
| 6,536,041 B1 * | 3/2003 | Knudson et al. | 725/50 |
| 6,553,178 B2 | 4/2003 | Abecassis | |
| 6,583,825 B1 * | 6/2003 | Yuen et al. | 725/54 |
| 6,587,561 B1 | 7/2003 | Sered et al. | |
| 6,601,237 B1 | 7/2003 | Ten Kate et al. | |
| 6,614,987 B1 | 9/2003 | Ismail et al. | |
| 6,637,029 B1 | 10/2003 | Maissel et al. | 725/46 |
| 6,675,384 B1 | 1/2004 | Block et al. | 725/28 |
| 6,681,396 B1 | 1/2004 | Bates et al. | |
| 6,684,240 B1 | 1/2004 | Goddard | |
| 6,698,020 B1 | 2/2004 | Zigmond et al. | |
| 6,704,930 B1 | 3/2004 | Eldering et al. | |
| 6,704,931 B1 | 3/2004 | Schaffer et al. | 725/46 |
| 6,738,978 B1 | 5/2004 | Hendricks et al. | |
| 6,799,326 B2 | 9/2004 | Boylan, III et al. | |
| 6,898,762 B2 * | 5/2005 | Ellis et al. | 715/716 |
| 6,918,131 B1 | 7/2005 | Rautila et al. | |
| 6,928,653 B1 * | 8/2005 | Ellis et al. | 725/50 |
| 6,950,623 B2 | 9/2005 | Brown et al. | |
| 6,981,040 B1 | 12/2005 | Konig et al. | |
| 6,990,677 B1 * | 1/2006 | Pietraszak et al. | 725/49 |
| 6,993,782 B1 * | 1/2006 | Newberry et al. | 725/59 |
| 7,003,792 B1 | 2/2006 | Yuen | |
| 7,013,478 B1 | 3/2006 | Hendricks et al. | |
| 7,035,528 B1 | 4/2006 | Britton | |
| 7,039,928 B2 | 5/2006 | Kamada et al. | |
| 7,051,351 B2 | 5/2006 | Goldman et al. | |
| 7,051,352 B1 | 5/2006 | Schaffer | |
| 7,054,900 B1 | 5/2006 | Goldston | 709/203 |
| 7,086,076 B1 * | 8/2006 | Park | 725/50 |
| 7,096,486 B1 | 8/2006 | Ukai et al. | 725/58 |
| 7,103,575 B1 | 9/2006 | Linehan | |
| 7,144,627 B2 | 12/2006 | Halas et al. | |
| 7,146,626 B1 * | 12/2006 | Arsenault et al. | 725/46 |
| 7,152,236 B1 | 12/2006 | Wugofski et al. | |
| 7,194,753 B1 * | 3/2007 | Fries et al. | 725/38 |
| 7,370,342 B2 | 5/2008 | Ismail et al. | |
| 7,594,247 B2 * | 9/2009 | Arai et al. | 725/54 |
| 2001/0004733 A1 | 6/2001 | Eldering | |
| 2001/0049826 A1 | 12/2001 | Wilf | 725/120 |
| 2002/0057893 A1 | 5/2002 | Wood et al. | |
| 2002/0073426 A1 * | 6/2002 | Bhatt | 725/46 |
| 2002/0118954 A1 | 8/2002 | Barton et al. | |
| 2002/0186296 A1 | 12/2002 | Gogoi et al. | |
| 2002/0199193 A1 | 12/2002 | Gogoi et al. | |
| 2002/0199194 A1 | 12/2002 | Ali | |
| 2003/0005432 A1 | 1/2003 | Ellis et al. | |
| 2003/0040962 A1 | 2/2003 | Lewis | |
| 2003/0056216 A1 * | 3/2003 | Wugofski et al. | 725/46 |
| 2003/0067554 A1 | 4/2003 | Klarfeld et al. | |
| 2003/0088872 A1 | 5/2003 | Maissel et al. | |
| 2003/0093792 A1 | 5/2003 | Labeeb et al. | |
| 2003/0101451 A1 | 5/2003 | Bentolila et al. | 725/34 |
| 2003/0118323 A1 | 6/2003 | Ismail et al. | |
| 2003/0145323 A1 | 7/2003 | Hendricks et al. | |
| 2004/0111742 A1 | 6/2004 | Hendricks et al. | |
| 2004/0117831 A1 | 6/2004 | Ellis et al. | |
| 2005/0047752 A1 | 3/2005 | Wood et al. | |
| 2005/0193410 A1 | 9/2005 | Eldering | |
| 2005/0235318 A1 | 10/2005 | Grauch et al. | |
| 2006/0206912 A1 | 9/2006 | Klarfeld et al. | |
| 2006/0212904 A1 | 9/2006 | Klarfeld et al. | |
| 2008/0040749 A1 | 2/2008 | Hoffberg et al. | |
| 2008/0134243 A1 * | 6/2008 | Klosterman | 725/44 |

FOREIGN PATENT DOCUMENTS

| | | |
|---|---|---|
| EP | 0 823 815 A2 | 2/1998 |
| EP | 0 838 951 A2 | 4/1998 |
| EP | 0 851 681 A1 | 7/1998 |
| EP | 0 854 645 A2 | 7/1998 |
| EP | 0 909 095 A1 | 4/1999 |
| EP | 1 045 582 A1 | 10/2000 |
| EP | 0 705 036 B1 | 3/2002 |
| EP | 1331814 | 7/2003 |
| WO | 9413107 | 6/1994 |
| WO | WO 94 13107 A1 | 6/1994 |
| WO | 9501057 | 1/1995 |

| | | |
|---|---|---|
| WO | WO 95 01057 A1 | 1/1995 |
| WO | WO 96 09721 A1 | 3/1996 |
| WO | WO 96 31980 A1 | 10/1996 |
| WO | 97/41673 A2 | 11/1997 |
| WO | WO 97 48230 A1 | 12/1997 |
| WO | WO 98 28906 A2 | 7/1998 |
| WO | 99/01984 A1 | 1/1999 |
| WO | 00/02380 A2 | 1/2000 |
| WO | 00/04708 A1 | 1/2000 |
| WO | 00/11869 A1 | 3/2000 |
| WO | 00/33160 A2 | 6/2000 |
| WO | 0117250 | 3/2001 |

OTHER PUBLICATIONS

*API Requirements for the Advanced Set-Top Box*, by OpenCable, Jun. 5, 1998, http://www.opencable.com/reference/apireq.html.
*The Challenges of Convergence for Set-Top Box Manufacturers*; IBM Microelectronics, Jun. 5, 1998, http://www.chips.ibm.com/set-topbox/007066.html.
*White Paper, Set-Top Box Solutions: Helping Customers Meet the Challenges of Convergence*; IBM Microelectronics, Jun. 5, 1998, http://www.chips.ibm.com/settopbox/whitepaper.html.
*Set-Top Box Peripheral Chip*; IBM Microelectronics, Jun. 5, 1998, http://www.chips.ibm.com/settopbox/peripheral.html.
*Set-Top Box Reference Design Kit*; IBM Microelectronics, Jun. 5, 1998, http://www.chips.ibm.com/settopbox/designkit.html.
*Set-Top Box Solutions*; IBM Microelectronics, Jun. 5, 1998, http://www.chips.ibm.com/settopbox/overview.html.
*OpenTV Operating Environment*, Technical White Paper, OpenTV, Inc., Jun. 8, 1998, http://www.opentv.com/hpk.html.
*Application Development for OpenTV, Technical White Paper*, OpenTV, Inc., Jun. 8, 1998, http://www.opentv.com/sdk.html.
*STARSIGHT: The Interactive On-screen TV Program Guide Service With One-button VCR Programming*; StarSight Telecast, Inc., Jun. 9, 1998, http://www.starsight.com/brochure.html.
*StarSight: An Introduction*, StarSight Telecast, Inc., Jun. 9, 1998, http://www.starsight.com/costory.html.
*Services for On-Screen Guides*; TVData, Jun. 9, 1998, http://www.tvdata.com/tv.htm.
*The Largest Databases of Television Information in the World*, TVData, Jun. 9, 1998, http://www.tvdata.com/data.htm.
*Metabyte Personalizes Microsoft TV*, Metabyte Networks, Inc., Jun. 14, 1999, http://www.mbtv.com/news/pressreleases/june1499.htm.
Oracle Lite, The Client Database for Java; by Oracle Lit, Jun. 5, 1998, http://www.oracle.com/clientdb.olite/.
Ravikant, N. et al., API Requirements for the Advanced Set-Top Box, Sep. 2, 1997, 14 pages.
IBM, The challenges of convergence for Set-Top Box manufacturers, Nov. 19, 1997, 14 pages.
IBM, Set-Top Box Solutions: Helping Customers Meet the Challenges of Convergence, Mar. 1997, 2 pages.
IBM, Set-Top Box Peripheral Chip, Mar. 1997, 3 pages.
IBM, Set-Top Reference Design Kit, Mar. 1997, 3 pages.
IBM, Set-Top Box solutions, Mar. 1997, 5 pages.
OpenTV, Inc., OpenTV Operating Environment, Feb. 1998, 9 pages.
OpenTV, Inc., Application Development for OpenTV, Feb. 1998, 11 pages.
OpenCable, Reference Material, Oct. 21, 1997, 1 page.
U.S. Office Action for U.S. Appl. No. 11/370,156 mailed on Oct. 9, 2007.
U.S. Office Action for U.S. Appl. No. 11/370,156 mailed on Feb. 22, 2008.
U.S. Office Action for U.S. Appl. No. 11/370,156 mailed on May 15, 2008.
U.S. Office Action for U.S. Appl. No. 11/370,156 mailed on Aug. 7, 2008.
U.S. Office Action for U.S. Appl. No. 11/370,156 mailed on Jan. 28, 2009.
U.S. Office Action for U.S. Appl. No. 11/370,081 mailed on Oct. 5, 2007.
U.S. Office Action for U.S. Appl. No. 11/370,081 mailed on Apr. 8, 2008.
U.S. Office Action for U.S. Appl. No. 11/370,081 mailed on Oct. 16, 2008.
U.S. Office Action for U.S. Appl. No. 09/963,335 mailed on Aug. 7, 2008.
U.S. Advisory Action for U.S. Appl. No. 09/963,335 mailed on May 15, 2008.
U.S. Final Office Action for U.S. Appl. No. 09/963,335 mailed on Feb. 22, 2008.
U.S. Office Action for U.S. Appl. No. 09/963,335 mailed on Oct. 9, 2007.
U.S. Office Action for U.S. Appl. No. 09/963,335 mailed on Apr. 5, 2007.
U.S. Advisory Action for U.S. Appl. No. 09/963,335 mailed on Dec. 18, 2006.
U.S. Final Office Action for U.S. Appl. No. 09/963,335 mailed on Aug. 10, 2006.
U.S. Office Action for U.S. Appl. No. 09/963,335 mailed on Jan. 25, 2006.
U.S. Office Action for U.S. Appl. No. 09/963,335 mailed on Nov. 14, 2005.
U.S. Office Action for U.S. Appl. No. 09/963,335 mailed on Jul. 7, 2009.
U.S. Final Office Action for U.S. Appl. No. 09/963,335 mailed on Jan. 22, 2009.
U.S. Office Action for U.S. Appl. No. 10/156,153 mailed on Jun. 2, 2009.
U.S. Final Office Action for U.S. Appl. No. 10/156,153 mailed on Jan. 26, 2009.
U.S. Office Action for U.S. Appl. No. 10/156,153 mailed on May 15, 2008.
U.S. Advisory Action for U.S. Appl. No. 10/156,153 mailed on May 5, 2008.
U.S. Final Office Action for U.S. Appl. No. 10/156,153 mailed on Jan. 24, 2008.
U.S. Office Action for U.S. Appl. No. 10/156,153 mailed on Aug. 24, 2007.
U.S. Office Action for U.S. Appl. No. 10/156,153 mailed on Feb. 27, 2007.
U.S. Office Action for U.S. Appl. No. 09/893,192 mailed Jun. 15, 2005.
U.S. Final Office Action for U.S. Appl. No. 09/893,192 mailed Aug. 2, 2007.
U.S. Office Action for U.S. Appl. No. 09/893,192 mailed Mar. 7, 2008.
U.S. Final Office Action for U.S. Appl. No. 09/893,192 mailed Mar. 17, 2009.
U.S. Office Action for U.S. Appl. No. 09/893,192 mailed Oct. 6, 2009.
U.S. Office Action for U.S. Appl. No. 09/953,327 mailed Sep. 14, 2005.
U.S. Final Office Action for U.S. Appl. No. 09/953,327 mailed Mar. 15, 2006.
U.S. Advisory Action for U.S. Appl. No. 09/953,327 mailed Jun. 5, 2006.
U.S. Office Action for U.S. Appl. No. 09/953,327 mailed Aug. 16, 2006.
U.S. Final Office Action for U.S. Appl. No. 09/953,327 mailed Mar. 21, 2007.
U.S. Office Action for U.S. Appl. No. 09/953,327 mailed Sep. 11, 2007.
U.S. Office Action for U.S. Appl. No. 10/043,714 mailed Jul. 6, 2006.
U.S. Final Office Action for U.S. Appl. No. 10/043,714 mailed Jan. 26, 2007.
U.S. Advisory Action for U.S. Appl. No. 10/043,714 mailed Jun. 14, 2007.
U.S. Office Action for U.S. Appl. No. 10/043,714 mailed Sep. 20, 2007.
U.S. Final Office Action for U.S. Appl. No. 10/043,714 mailed Mar. 24, 2008.
U.S. Advisory Action for U.S. Appl. No. 10/043,714 mailed Jul. 11, 2008.
U.S. Office Action for U.S. Appl. No. 10/043,714 mailed Oct. 8, 2008.

U.S. Final Office Action for U.S. Appl. No. 10/043,714 mailed May 26, 2009.
Office Action issued in Japanese Patent Application No. 002179/2002, Jan. 15, 2008 (English Translation enclosed).
Kageyama et al., "A Free Time Shift DVD Video Recorder"; Aug. 1997, IEEE, pp. 463-473.

Lawrence R. Rabiner, "A Tutorial on Hidden Markov Models and Selected Applications in Speech Recognition", Proceedings of the IEEE, vol. 77, No. 2, pp. 257-286, Feb. 1989.

* cited by examiner

DATABASE MANAGEMENT SYSTEM AND METHOD FOR ELECTRONIC PROGRAM GUIDE AND TELEVISION CHANNEL LINEUP ORGANIZATION

CROSS-REFERENCE TO RELATED APPLICATIONS

This application claims the benefit under 35 U.S.C. §119 (e) of provisional application No. 60/293,763, filed May 25, 2001.

This application is also a continuation-in-part under 35 U.S.C. §120 of copending application Ser. No. 09/893,192, filed Jun. 27, 2001, entitled "Method and Apparatus for Delivery of Television Programs and Targeted De-Coupled Advertising," which is herewith incorporated by reference, and which claimed the benefit under 35 U.S.C. §119(e) from provisional application Nos. 60/215,450 filed Jun. 30, 2000 and 60/226,437 filed Aug. 18, 2000. Further reference is had to the commonly assigned, copending application Ser. No. 09/096,592, filed Jun. 12, 1998, entitled "Television Program Recording with User Preference Determination", and to our copending application Ser. No. 10/156,153, for "System And Method For Generating And Managing User Preference Information For Scheduled And Recorded Television Programs" being filed herewith and which is also herewith incorporated by reference.

BACKGROUND OF THE INVENTION

Field of the Invention

The invention lies in the field of interactive television programming. Specifically, the invention pertains to a database management system for automatic television program determination, viewer preference information gathering and generation, and management of service-to-channel allocation changes.

Determination of a television user's program viewing preferences is an important function in the context of digital TV (DTV) and digital set top boxes (STB, DSTB)—especially those with program storage capability—for a variety of applications. Specifically, viewing preferences are required to support applications that select for the user, for example:
- data for a personalized electronic program guide (EPG);
- audio/visual (AV) programs or content for viewing later at a convenient time;
- segments and ads for compilation into a sequence of programs or a separate channel, such as a virtual channel.

Ease of database management is becoming increasingly more important as the size of available useful data and data record entries grows. Sophisticated modern program preference determination engines (MetaByte Networks, Inc.) utilize ever more sophisticated demographical data records. Also, the number of channels available for a channel lineup increase steadily and internally available channel lineup lists vary continually with the quickly fluctuating fields of available programming.

Program guide information is available from external electronic program guide (EPG) structures. That information is provided primarily for graphical user interface (GUI) presentation at the user end. Such data structures are carried in voluminous data packages and their use for internal processing is extremely slow, requires a considerable amount of memory and processing time. Further, those data structures hinder system operation in their use, or their adaptation and copying, to manage service-to-channel changes.

SUMMARY OF THE INVENTION

It is accordingly an object of the invention to provide a system and method for database management for internal electronic program guide and channel lineup management, which overcomes the above-mentioned disadvantages of the heretofore-known devices and methods of this general type and which provides for easily manageable data structures and manageable algorithms for channel lineup changes.

With the foregoing and other objects in view there is provided, in accordance with the invention, a method of managing channel lineup information in a television system, which comprises:

obtaining external channel lineup information from an external program guide offered by a television program provider;
generating internal channel lineup information from the external channel lineup information, the internal channel lineup information containing less information than the external channel lineup information, yet sufficient information to render the internal channel lineup information useful in an internal database management system; and
updating the internal channel lineup information upon receiving notification of a change to the external channel lineup information, by repeating the obtaining and generating steps.

In accordance with an added feature of the invention, the external channel lineup information is downloaded from an external electronic program guide in standard EPG data structure format. The external channel lineup is then formatted and indexed for use in the internal channel lineup information and for use in an internal preference determination engine (PDE).

In accordance with an additional feature of the invention, the internal channel lineup information is structured by indexing individual available channels to a channel identifier (chID) and a channel name index (chName-index). In a preferred embodiment, the internal channel lineup information further comprises a time field and a flag field indicating a time until which or after which the respective channel is valid.

In accordance with another feature of the invention, the internal channel lineup information comprises a first list indexing the external channel lineup received from the external program guide, a second, hierarchically lower list indexing a subscription channel lineup, and a third, hierarchically lowest list indexing a list of most-watched channels and subscription channels.

In accordance with a further feature of the invention, the updating step comprises processing a channel lineup change algorithm in which each channel available in an updated external channel lineup is searched in the internal channel lineup and, if a given channel identifier is not found, the respective channel is added to the internal channel lineup.

In accordance with again an added feature of the invention, the method further comprises removing channel identifiers of those channels from the internal channel lineup which no longer appear in the updated external channel lineup.

In accordance with again an additional feature of the invention, the channel lineup change algorithm is configured to add new service items of an updated external channel lineup, to close and remove closed service items from the internal channel lineup, and to reallocate a given service to a different channel in the internal channel lineup.

Preferably, the channel lineup change algorithm is programmed to avoid duplicate entries in the internal channel lineup and to avoid removing given entries from the internal channel lineup, by indexing the entries with a reference counter indicating multiple entry of a given service.

With the above and other objects in view there is also provided, in accordance with the invention, a system for managing channel lineup information in a digital television system, comprising:

an input for receiving television program content and related external channel lineup information with channel names and data items suitable for a graphical user interface;

an internal electronic program guide processor programmed to generate from the external channel lineup information internal channel lineup information with indexed data items listing the channel lineup information with reduced data structure as compared to the external channel lineup information; and an update agent programmed to update the internal channel lineup information upon learning of a change to the external channel lineup information.

In accordance with again a further feature of the invention, the update agent is programmed to process a service-to-channel change management algorithm.

The management system outlined above is particularly suitable in the context of a preference determination engine in a television broadcast system. In that case, the management system includes a database containing program information and viewing history of at least one user of the television system.

In further summary, a internal electronic program guide (EPG) manager (IEM), creates and maintains an internal EPG (IE) information database for the user program preference determination engine (PDE), which is resident in a STB, DTV or PVR. The term internal, as used herein, refers to the fact that the EPG data are for use by software agents of the PDE and are not used to make the main system graphical user interface EPG. The external EPG is used for that purpose. The IEM provides other software agents with various control interfaces to enable extraction of the program information from the IE database, for maintenance and to update changes, e.g. channel-line-up changes, that arise from changes to the external EPG.

Other features which are considered as characteristic for the invention are set forth in the appended claims.

Although the invention is illustrated and described herein as embodied in a system and method for database management for internal electronic program guide and channel lineup management, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
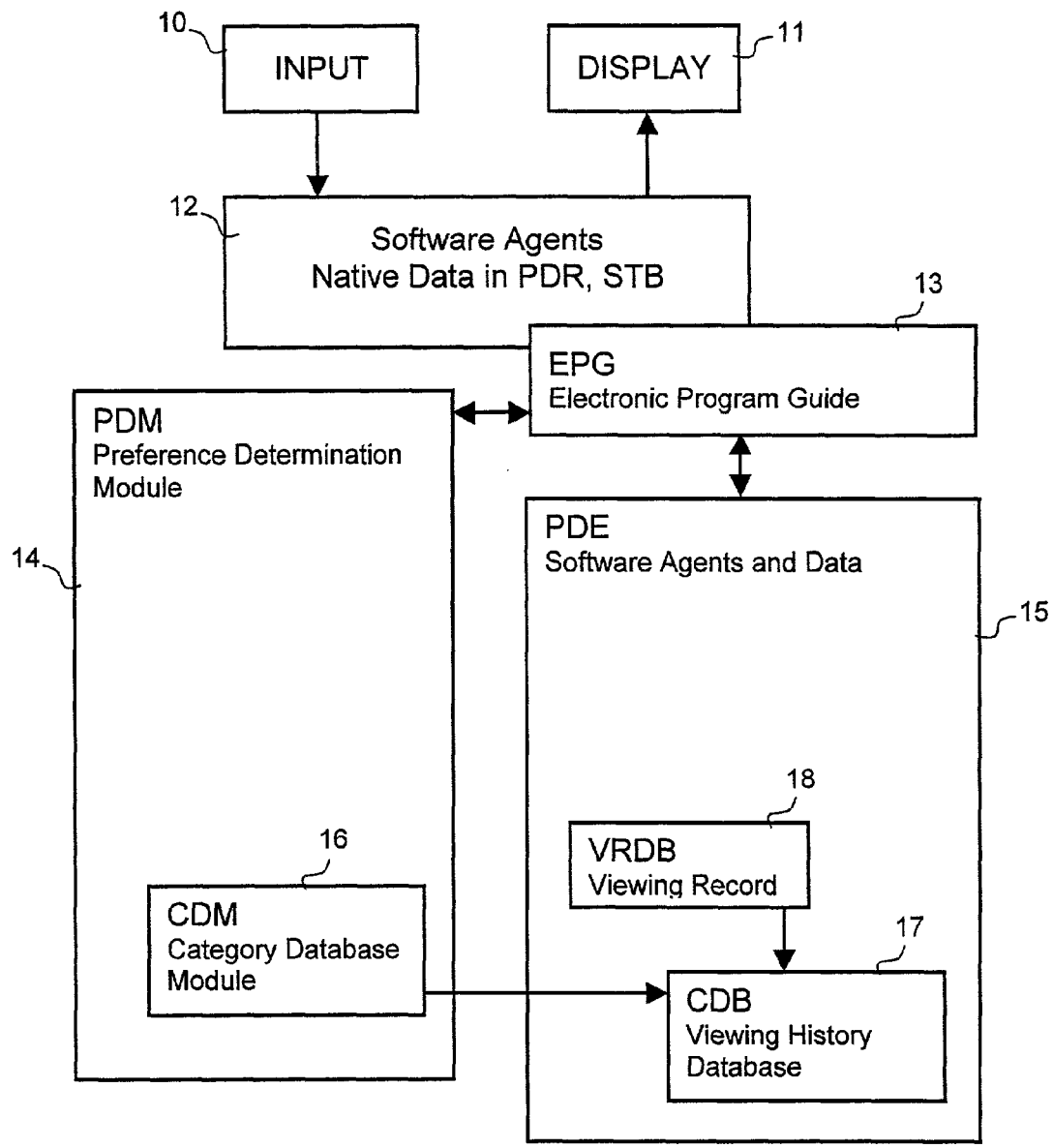
FIG. 1 is a block diagram providing an overview over the architecture of a novel preference determination engine.
Figure 2:
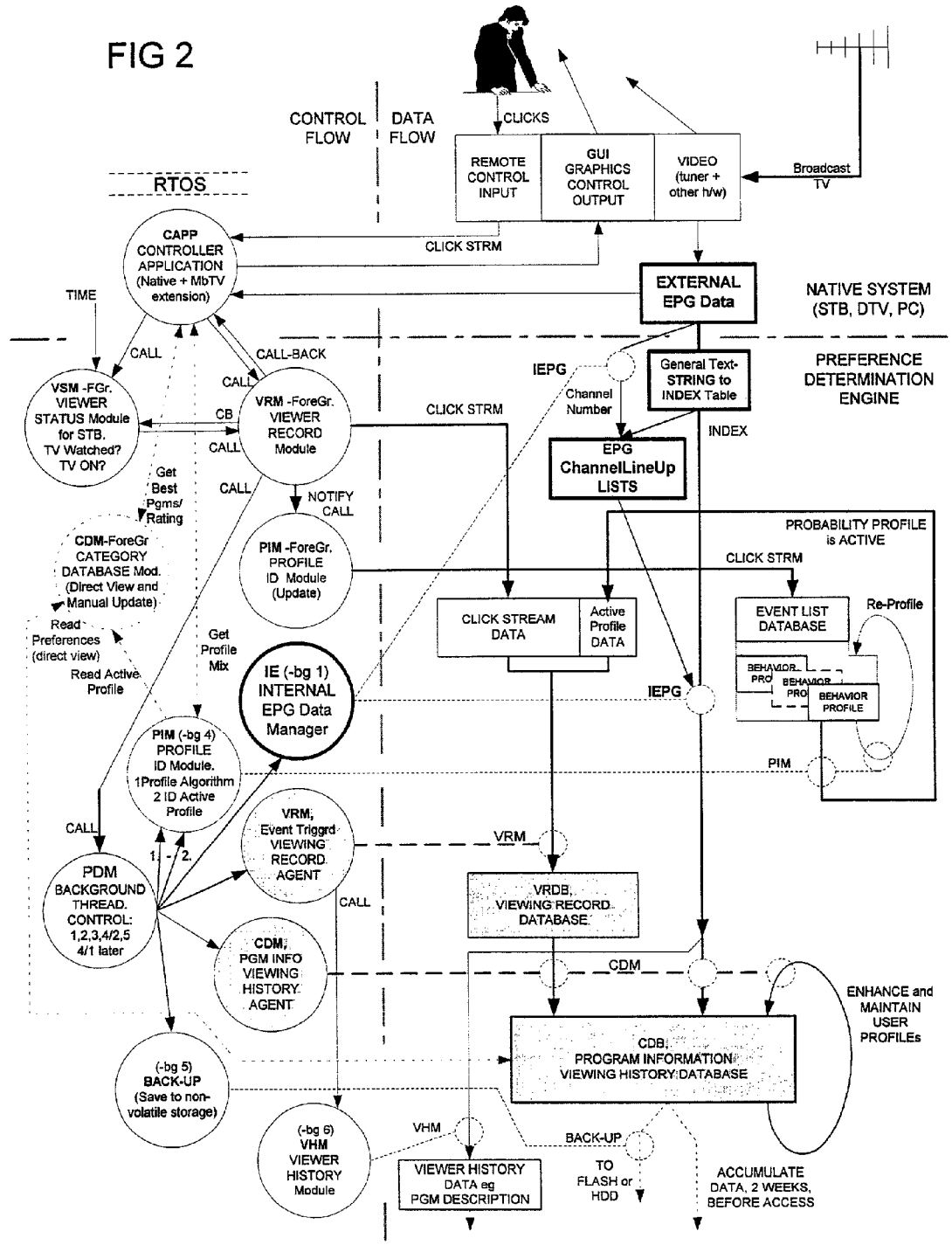
FIG. 2 is a detailed schematic block diagram illustrating a preference determination engine including the database management system according to the invention.

Referring now to the figures of the drawing in detail and first, particularly, to FIGS. 1 and 2 thereof, there is illustrated a complete preference determination engine (PDE) software architecture in which the method and system according to the invention is integrated. FIG. 1 is a simplified block diagram of the more detailed architecture of FIG. 2. The input block 10 represents the various input sources from which the system draws. These sources include, for instance, a cable hookup, a broadcast antenna, a satellite decoder, a video source (including optical disks and similar storage devices), a user click stream, generalized demographic information, and so on. The display block 11 refers to a screen and a graphics control output for a user interface GUI. Various software agents and data that are native in all PDR or set top box (STB) systems are combined in a top level block 12. An electronic program guide EPG 13 forms the internal interface between the top level block 12 and the lower level, i.e., the internal system level. The latter, which forms the program and data system of the preference determination engine PDE is explained in two blocks, namely, a preference determination module PDM 14 and the PDE software agents and data 15.

The software agents comprising the preference determination module PDM 14 perform operations on data in the software and data block 15. The core system of the PDM 14 is the category database module CDM 16 which defines a user program preference database or category database CDB 17. The latter is also referred to as a program information and viewing history database 17. One of the primary inputs into the CDB 17 originates from the viewing record database VRDB 18. An internal EPG manager (IEM) agent of the PDM manages the Channel Line-Up lists. The Category Database Module (CDM) of the PDM specifically manages CDB creation and maintenance.

Since the invention pertains primarily to the generation and maintenance of a channel lineup list to be utilized in the PDM 14, the following description deals mainly with the system for the formation and for changing channel lineup lists.

A channel lineup is a cross-reference list of two main items:

Named programming stream services such as, for example, BBC, NBC, CNN-Headline-News, etc.

Tunable channel, e.g. tunable broadcast channel, using analog and/or digital tuning.

Typically, video programming services are carried on more than one broadcast system and they are assigned different channel numbers on different systems.

The term "channel lineup change" as used herein encompasses a re-allocation of a service from one numbered channel to another, or the addition or removal of a service from the total number of available numbered channels.

According to the invention, any number of channel lineup lists may be maintained in a hierarchical order. In a preferred embodiment, we utilize three such lists:

Internal ChannelLineUp is a complete list of all channels (e.g. >500) and related information provided by an external EPG. This list stores the channel information for all the channels provided by the external EPG. This channel list depends on the number of channels available in the external EPG and may vary from, say, 100 to 1000, depending on whether it is a cable or satellite system. The list is used for program guide graphics display in the display 11. Since using and processing the complete ChannelLineUp list, is very tedious and time-consuming, it is necessary to generate and maintain a lower level list that is more suitable for internal processing. The list will be referred to as the MbTV ChannelLineUp.

MbTV ChannelLineUp list consists of a limited and fixed number of channels, typically 100. It is determined by the MbTV preference determination system, developed by MetaByte Networks, Inc. The MbTV ChannelLineUp is a subset of the external ChannelLineUp list and consists of both premium and non-premium channels. The PDM internally updates this list with the most watched channels and subscription channels subscribed by the user. This list is mainly for use by the program history agent or category database module CDM 16 to generate user preferences and for calculating MbTV program picks for each profile.

SubscriptionChannelLineUp list is also a subset of the external ChannelLineUp list, which stores exclusively the information pertaining to subscription channels. This list maintains a list of premium channels subscribed by the user.

Repeated changes in the program availability and channel lineups of the various content providers render frequent channel lineup changes necessary. The invention provides an algorithm that outlines a method for dealing with channel lineup changes.

First, it is paramount that the data structures of the system be properly defined. For example, the following structural data definitions in the context of the channel lineup (ChannelLineUp) in the internal electronic program guide (IEPG) may be provided:

```
typedef struct
{
    void      *chID;         /* channel ID */
    time_t    time;          /* time that the channel is updated. */
    ushort    chNameIndex;   /* channel name index in string
                                table. */
    ushort    flag;          /* 15 :process bit. it toggles.   *
                             /* 7-0:specify, when channel is
                                available. */
} iemChnl_t;
```

Figure 3:
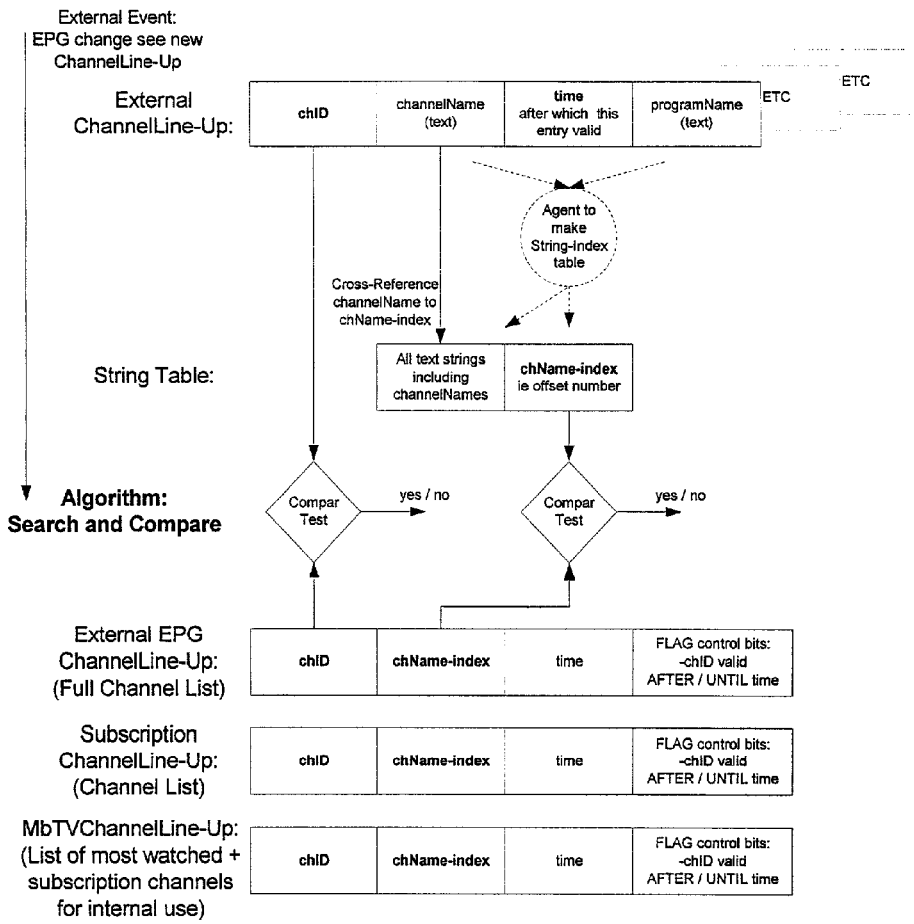
FIG. 3 is an illustrative block diagram showing a database subsystem with a channel lineup.

With reference to FIG. 3, the ChannelLineUp list stores channel information in the above data structure. The following names data items are defined:

chID is the ChannelId number of the channel time is the time at which the channel information was last updated and after which the specific entry is valid or invalid as marked by the flag field.

chNameIndex is the index of the channelName in the String Table where channelName is the name of the programming service eg BBC, NBC, CNN-HeadlineNews, using the channel numbered by channelID.

flag field denotes the availability of this channel. States flagged are TILL-TIME and AFTER-TIME, which specifies that the channel information is valid unTIL or AFTER the specified value in the time field.

All the channel names (channelName) are stored in another structure called the String Table.

All strings useful to internal processing, including the channelNames, are stored in this String Table. The String Table provides an index to each string, chNameIndex, and a reference count. The database has the following structure. The file header of the table on disk or flash memory appears in first five fields:

```
typedef struct
{
    ulong    delList;      /* index of the first deleted string in the
                              list of deleted strings */
    ulong    size;         /* offset of free space */
    ulong    maxSize;      /* maximum table size */
    ulong    strNum;       /* number of strings in the table */
    ulong    maxStrNum;    /* maximum string number */
    char     *data;        /* pointer to table data */
    mbtv_t   *dataPtrs;    /* pointer to the array of sorted pointers to
                              the table data */
} table_t;
```

The pointer (*data) is the address of memory structured as elem_t ARRAY[maxStrNum], where MaxStrNum is a maximium size of the string table.

```
elem_t is the following structure:
    typedef struct
    {
    short refCount;
    char string [];
    }
```

The String Table stores all strings used by the IEM and other agents and enables their speedy access. It actually consists of N separate string tables for the storage of strings of different lengths and all entries are numbered where the number represents the offset or start position of the string in the table.

Each data element of the string table consists of the reference count of the string and the string itself (null-terminated). Reference count is the count of the number of attempts made to put the identical string into the string table subsystem (instead of actually making duplicate entries). That is, it is impossible for the string table xubsystem to have duplicate entries.

An attempt to delete a string causes its reference count to be decremented by one. If reference count becomes zero, the entry is considered as empty or deleted. Each string table keeps track of all deleted entries by having a linked list of them. The most recently deleted entry is pointed to by the delList variable of the string table structure the value of which is it's offset. Each deleted entry consists of the offset of the next deleted entry followed by zero.

To speed up string retrieval each string table has an array of sorted pointers to the strings of the table where sorting is in the sense of the alphabetic order of the data. Access to the data is indirect i.e. pointers to the sorted pointers first and then to the data. The address of this array is stored in the dataPtrs variable of the string table structure. Elements (pointers) are inserted into dataPtrs array using binary insert algorithm. They are retrieved by using binary search algorithm. It allows maximum speed for insert/retrieve operations.

After initialization, all new strings are stored at offset stored in the sizevariable of the string table structure.

After some use when the string table is full and there is a list of deleted entries the first deleted entry from the list is reused.

Figure 4:
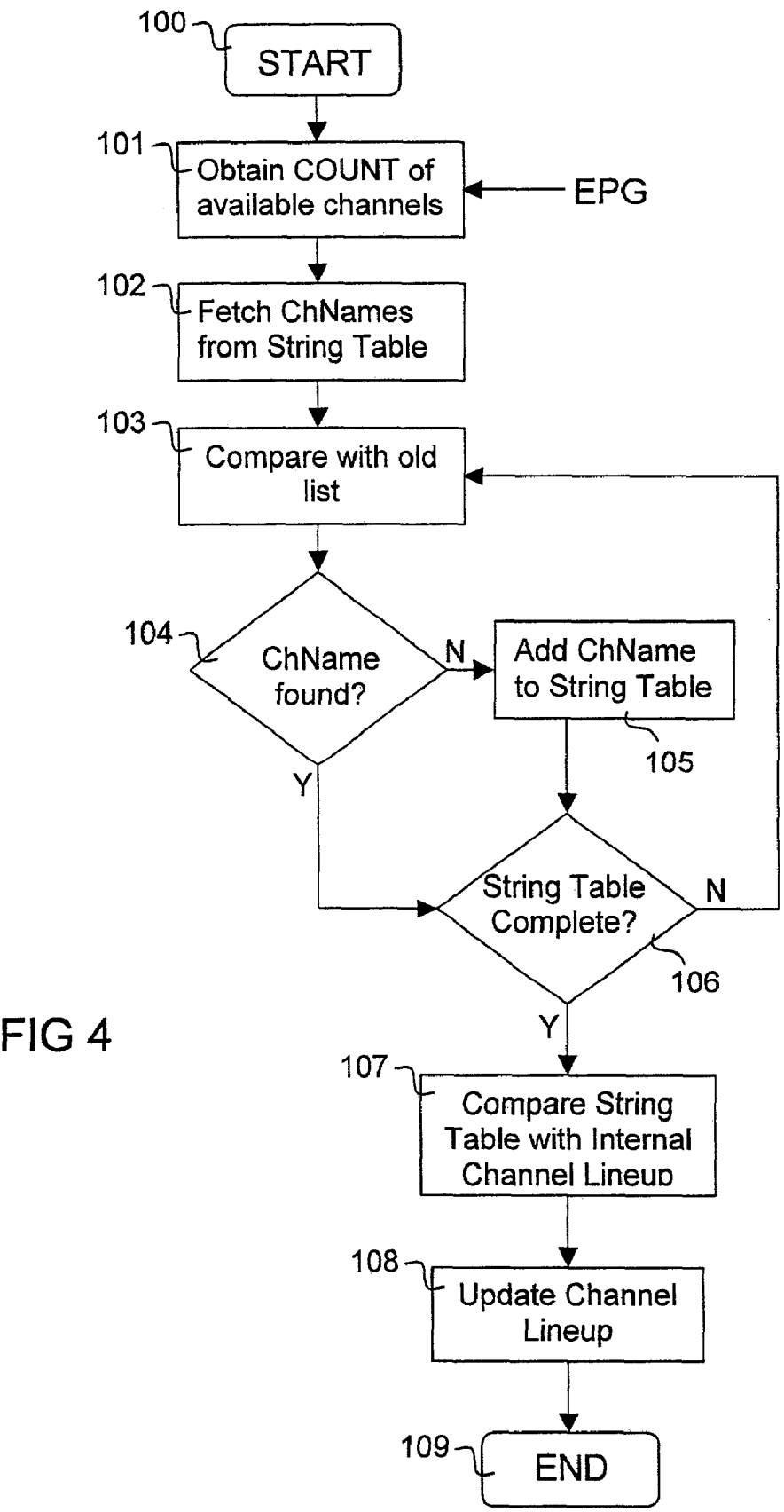
FIG. 4 is a flowchart illustrating the channel lineup algorithm according to the invention.

If the number of strings in the string table stored in the strNum variable=value of maxStrNum variable The system will attempt to place new strings into the next available string table. This must be done if there is a channel lineup change. Upon such a change, the system receives a channel lineup change notification. In other words, the controlling application, external EPG system, provides a notification of a channelLineUp change event to the underlying PDM. The PDM initiates the IEM agent to update the ChannelLineUp lists: Internal channelLineUp, MbtvChannelLineUp and SubscriptionChannelLineUp with the new information. The channel lineup is modified with the channel lineup change algorithm, which is outlined in the flowchart of FIG. 4.

The system first receives an event notification from the external EPG system of a change or imminent change (at specified TIME) in the channel lineup. The event notification does not include the details of the items change. Therefore, the algorithm must search and compare the changed external EPG and the internal channel lineup to see what modifications are required. The procedure is as follows.

After the procedure has been initiated at start 100, the system obtains the count of available channels from the external EPG at step 101.

All channel IDs and names (index) in the ChannelLineUp structure are then searched and checked against the new external EPG channelLineUp as follows: ChannelIds and corresponding channelNames are fetched from the new external EPG at 102.

As indexes are used instead of name text strings, in the following processing, the index, chName-index, of each channel name is fetched from the string table. If chName is not found in the old list at 104, it is added at 105 to the string table and an index obtained.

The routine cycles through steps 103, 104 and 105 until the string table is found to be complete at 106.

Then the internal ChannelLineUp list is searched at 107 for the channelId and chName-index. There are four possible cases, as follows:

If the channelId (chId) is found and the corresponding chName-index matches with the index obtained above then there is no change in this channel data.

If the channelId (chId) is found, but the corresponding chName-index differs from the index obtained above, the name of the service with this chID entry is thus deemed changed and the entry must be prepared for deletion.

The channel information is first moved to the end of channelLineUp list and the flag field, TILL TIME, is set to signify that the chID is valid only until the time field. This move is made to make it easier for the search mechanism to find the item and delete it.

Next, the original chID position is filled with the channelName index obtained above, and the time is updated. The flag field is set to AFTER TIME to signify this channelID becomes valid i.e. after the time field.

If the ChName-index is found, but the corresponding chId differs, this is deemed to be a new chId and it is thus added to the channelLineUp list and a new index is obtained for it.

The channelLineUp list, chID entry, is updated with Time, chName-index, and the flag field is set to AFTER TIME.

If the chId is not found and the chName-index is not found, a new chName-index is created in the channelLineUp list with time, chName-index, and the flag is set to AFTER TIME.

The same process sequence holds true for all channel lineups. That is, once the ChannelLineUp list is updated, the Subscription ChannelLineUp and MbTV ChannelLineUp lists are then verified and updated as required using the same method.

In summary, the "channelLineUp" is a set of customized information structures that includes only the minimum necessary information and in a minimal format for efficient internal processing. It can be easily seen that the internal processing with the channel data channelLineUp provides a substantial simplification of the processing and adds efficiency with a limited amount of required processing power.

As noted in the introduction, an alternative would be to use the external EPG structure, which is designed primarily for GUI information presentation. Such processing would be much slower, use more memory and processing time. Copying, adapting, and processing for service-to-channel change management would be by far too complicated.

Management of any changes to the channel lineup is efficiently effected with the above-described service-to-channel change management algorithm. The algorithm handles all the possible changes that can arise in the channel lineup, such as, the addition of a new service, preparation for the removal and closing or the removal of closed service, re-allocation of services to different or multiple channels. Time and flag fields employed to accurately define the change occurrence.

The use of the indexed string table to store the channel names and related information provides for simplified localization of all the information at one point and the index provides easy access to the strings.

Text processing, e.g. checking existence of the name string using compare functions, can be done with the index (usually in simplified, i.e., brief form) instead of the text. This improves the speed and efficiency of the compare operation and memory space used. Both advantages are important for embedded systems.

The counter Reference_Count allows tracking of the usage, by multiple different agents, of a text string entry in the string table to avoid retention of redundant strings and avoid duplicating strings, one per use or agent, as a way of keeping track of the current ones. This helps minimize total memory allocation by allowing the use of a singular text-index table for all agents and allowing it to be managed efficiently.

Additional information concerning some internal EPG and string table software routines may be found in the copending application Ser. No. 09/893,192, specifically on pages 150 to 162. The copending application also describes a channel lineup update process on page 155 thereof.

We claim:

1. A method of managing channel lineup information in a television system, the method comprising:
   receiving an external program guide offered by a television program provider external to the television system, the external program guide including external channel lineup information;
   generating internal channel lineup information locally in the television system from the external channel lineup information, where all of the internal channel lineup information combined contains information less than all of the combined external channel lineup information;
   using the internal channel lineup information for internal processing of a database management system; and
   updating the internal channel lineup information upon receiving notification of a change to the external channel lineup information, by repeating the receiving and the generating steps, and wherein:
   a data structure of the external channel lineup information includes more variables than a data structure of the internal channel lineup information;
   name text strings of channels in the external program guide are replaced with indexes in the internal channel lineup information;
   the internal channel lineup information includes the data structure and a plurality of string tables including the indexes; and the plurality of string tables comprises:
- a plurality of data elements, each data element containing a string and a reference count of the string, wherein the reference count is a number of attempts made to put the string into one of the string tables;
- an array of pointers to the data elements, the array of pointers sorted alphabetically according to the string associated with the data element to which each pointer is directed; and
- a data pointer directed to the array of sorted pointers.

2. The method according to claim 1, further comprising downloading the external channel lineup information from an external electronic program guide formatted in standard electronic program guide (EPG) data structure, and formatting and indexing the internal channel lineup information for processing use in an internal preference determination engine (PDE).

3. The method according to claim 2, further comprising structuring the internal channel lineup information by indexing individual available channels to a channel identifier (chID) and a channel name index (chName-index).

4. The method according to claim 3, wherein the internal channel lineup information comprises a time field and a flag field indicating a time until which or after which the respective channel is valid.

5. The method according to claim 4, wherein the internal channel lineup information comprises:
- a first list indexing the external channel lineup information received from the external program guide;
- a second, hierarchically lower, list indexing a subscription channel lineup; and
- a third, hierarchically lowest, list indexing a list of most-watched channels and subscription channels.

6. The method according to claim 5, wherein the third, hierarchically lowest, list is automatically updated based on watched channels and subscription channels.

7. The method according to claim 5, wherein updating comprises:
- processing a channel lineup change algorithm in which each channel available in an updated external channel lineup is searched in the internal channel lineup information; and
- if a given channel identifier is not found, adding the respective channel to the internal channel lineup information.

8. The method according to claim 7, further comprising removing channel identifiers of those channels from the internal channel lineup information that no longer appear in the updated external channel lineup.

9. The method according to claim 7, wherein the channel lineup change algorithm is configured to add new service items of the updated external channel lineup, to close service items and remove closed service items from the internal channel lineup information, and to reallocate a given service to a different channel in the internal channel lineup information.

10. The method according to claim 7, wherein the channel lineup change algorithm is programmed to avoid duplicate entries in the internal channel lineup information and to avoid removing given entries from the internal channel lineup information by indexing the entries with a reference counter indicating a number of attempted entries of a given service.

11. The method of claim 1, wherein the data structure of the external channel lineup information includes more fields than the data structure of the internal channel lineup information.

12. The method of claim 1, wherein the internal channel lineup information is based on user preference and updated with most watched channel information from a user.

13. The method of claim 1, wherein the internal channel lineup information is not used for displaying program guide listings.

14. The method of claim 1, wherein the data structure of the internal channel lineup information includes:
- a channel identification field, a time of channel update field, a channel name index field, a process field and a channel availability field.

15. The method of claim 1, wherein generating the internal channel lineup information further comprises:
- importing a new string value to one of the plurality of string tables by storing said new string value in a data element and inserting a pointer into said array of sorted pointers using a binary insert algorithm.

16. A system for managing channel lineup information in a digital television system, comprising:
- an input for receiving an external electronic program guide including television program content and related external channel lineup information with channel names and data items suitable for a graphical user interface;
- a local internal electronic program guide processor programmed to generate from the external channel lineup information, internal channel lineup information with indexed data items including the internal channel lineup information with reduced data structure variables and less information as compared with the external channel lineup information, the internal channel lineup information configured for use in internal processing of an internal preference determination engine (PDE), where all of the internal channel lineup information combined contains information less than all of the combined external channel lineup information; and
- an update agent programmed to update the internal channel lineup information upon learning of a change to the external channel lineup information, and wherein:
- name text strings of channels in the external program guide are replaced with indexes in the internal channel lineup information;
- the internal channel lineup information includes a plurality of string tables including the indexes; and
- the plurality of string tables comprises:
- a plurality of data elements, each data element containing a string and a reference count of the string, wherein the reference count is a number of attempts made to put the string into one of the string tables;
- an array of pointers to the data elements, the array of pointers sorted alphabetically according to the string associated with the data element to which each pointer is directed; and
- a data pointer directed to the array of sorted pointers.

17. The system according to claim 16, wherein the update agent is further programmed to process a service-to-channel change management algorithm.

18. The system according to claim 17, wherein the digital television system comprises a television broadcast receiving system, and wherein the television broadcast receiving system comprises the internal preference determination engine PDE utilizing a database containing program information and viewing history of at least one user of the digital television system.

* * * * *